W. X. STEVENS.
Shears for Cutting off Bar-Iron.

No. 146,846. Patented Jan. 27, 1874.

WITNESSES:
Moses Hobbs.
Josiah Hobbs.

INVENTOR:
William X. Stevens.

UNITED STATES PATENT OFFICE.

WILLIAM X. STEVENS, OF EAST BROOKFIELD, MASSACHUSETTS.

IMPROVEMENT IN SHEARS FOR CUTTING OFF BAR-IRON.

Specification forming part of Letters Patent No. 146,846, dated January 27, 1874; application filed November 3, 1873.

*To all whom it may concern:*

Be it known that I, WILLIAM X. STEVENS, of East Brookfield, in the county of Worcester and State of Massachusetts, have invented Shears for Cutting Off Bar-Iron, of which the following is a specification:

The object of my invention is to shear off bar-iron of larger size than has ever been so cut, and to shear off common sizes with greater ease, by means of a cutting blade or die, D, within the trunnion of one arm, B, of the shear, in combination with a similar opposing blade or die, C, within or held by the other arm A, which incases and serves as a bearing in which said trunnion of arm B revolves or oscillates.

As here shown, A is the body of the machine, made, most economically, of cast-iron. C is a square die of steel, having holes cut through it, to correspond to the form and size of iron to be cut, and is held securely in a recess of corresponding form in frame A. D is an opposing die exactly corresponding to C, but held in the trunnion of oscillating arm B.

Figure 1:
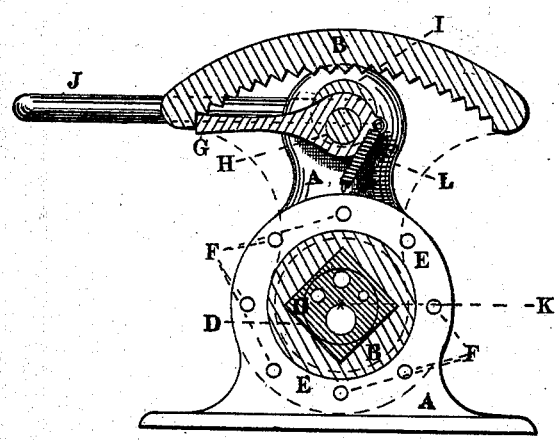

In Figure 1, D represents both dies C and D as they stand before either die is turned in use. E is a collar secured to body A by means of bolts F, for the purpose of holding the dies or blades C and D in contact, which it does by means of an annular bearing on the outer face of lever B. The upper end of arm B is an arc of a circle from center K of the trunnion, and supplied with gear-teeth, which, for sake of their strength, are made internal. Into these teeth works a pawl, G, hung upon the crank or eccentric H of shaft I, which is turned in a bearing at the top of body A by means of a hand-lever, J. L is a spring attached at one end to body A, and at the other end to pawl G, to press the end of pawl G into engagement with the teeth upon arm B.

Figure 2:
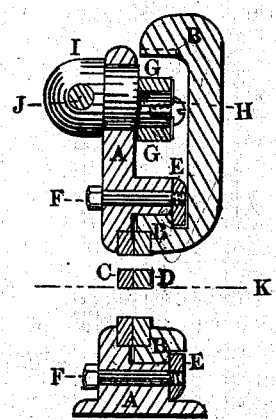
Figure 3:
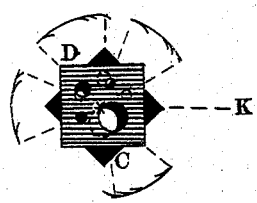

The dies represented in Figs. 1, 2, and 3 are for cutting off round iron from the size of the largest opening to O.

Figure 4:
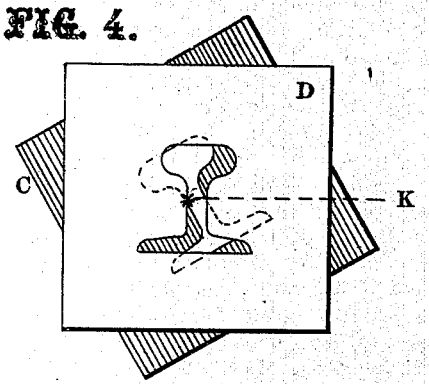
Figure 5:
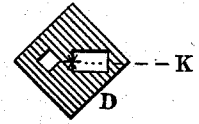

Fig. 4 shows dies for cutting off rails; and Fig. 5 is a die suitable for cutting square and flat iron.

One pair of dies may have many different holes suitable for peculiar-shaped iron; or the levers A and B may be of steel, having die-holes for cutting made directly in them; or many sets of dies may be used in the same machine.

By means of lever J shaft I is given a reciprocating motion through an arc of about one hundred degrees; or by completely revolving shaft I by power crank H draws pawl G back one tooth; then pushing against said tooth revolves the whole arm B and its die D through the minute arc of a circle subtended by the base of said tooth; and each repetition produces the same result until the whole segment of teeth on arm B pass beyond reach of pawl G, or until a bar inserted in the dies has been cut off, when pawl G is held away from the teeth and arm B is returned to position by hand; or the pawl may be swung over to point the other way, so as to cause the opposite edges of the dies to cut. Thus either side of the machine may be its front and the dies give double wear.

Fig. 3 shows the relative position of the cutting holes before and after work, C being stationary and D revolving, as indicated by the arrows.

For cutting bar-iron, I make the largest hole in the dies with one edge of the hole at their center of revolution, K, to reduce to a minimum the leverage against me; and experiment has shown that common iron severs when penetrated about one-fifth its diameter by the shear-blade; therefore, a segment of gear-teeth on arm B equal to an arc of ninety degrees is enough for practical purposes.

In the old form of shear a bolt large enough to withstand the strain and wear of cutting must occupy the center, and work cannot be brought nearer center than is safe against breaking the steel die out at the bolt-hole; but by means of my inserted trunnion being so large as to contain the whole die I produce a fulcrum so large that any-sized iron whatever may be cut off, all parts being proportional without danger to the bearing; and by means of my crank, pawl, and gear combination I am able to multiply the leverage to an extent only limited by the power of each tooth to resist crushing.

I claim as my invention and wish to secure by Letters Patent—

1. The combination in shears for cutting metal of the lever or shear arms A and B, jointed, by means of a trunnion, upon the lever B, entering and revolving in a complete circular bearing of the lever A (so held by means of the collar E and bolts F) with the dies or shear-edges C and D within the circular bearing of and held, respectively, by aforesaid levers A and B.

2. The combination of lever A, toothed lever B, shaft I, crank or eccentric H, and pawl G, substantially as shown and described.

WILLIAM X. STEVENS.

Witnesses:
   MOSES HOBBS,
   JOSIAH HOBBS.